(12) United States Patent
Matveyev et al.

(10) Patent No.: US 11,579,641 B2
(45) Date of Patent: Feb. 14, 2023

(54) TWO-WIRE INDUSTRIAL PROCESS FIELD DEVICE POWER SUPPLY CIRCUITRY

(71) Applicant: Rosemount Inc., Shakopee, MN (US)

(72) Inventors: Yevgeny Aleksandrovich Matveyev, Chelyabinsk (RU); Pavel Pavlovich Schmidt, Chelyabinsk (RU); Nikolay Alekseevich Isaev, Chelyabinsk (RU); Sergey Valerievich Dubrovin, Chelyabinsk (RU); Valentin Gennadievich Varnak, Chelyabinsk (RU)

(73) Assignee: ROSEMOUNT INC., Shakopee, MN (US)

( * ) Notice: Subject to any disclaimer, the term of this patent is extended or adjusted under 35 U.S.C. 154(b) by 178 days.

(21) Appl. No.: 17/049,690

(22) PCT Filed: Mar. 26, 2020

(86) PCT No.: PCT/RU2020/000160
§ 371 (c)(1),
(2) Date: Oct. 22, 2020

(87) PCT Pub. No.: WO2021/194368
PCT Pub. Date: Sep. 30, 2021

(65) Prior Publication Data
US 2021/0303010 A1    Sep. 30, 2021

(51) Int. Cl.
*H02J 1/06* (2006.01)
*G05F 1/46* (2006.01)
*H02J 13/00* (2006.01)

(52) U.S. Cl.
CPC ............... *G05F 1/46* (2013.01); *H02J 1/06* (2013.01); *H02J 13/00001* (2020.01); *H02J 13/00002* (2020.01)

(58) Field of Classification Search
CPC ............ G05B 19/4185; G05B 19/4184; G05B 19/0423; G05B 19/409; G05B 19/02;
(Continued)

(56) References Cited

U.S. PATENT DOCUMENTS

| 8,005,514 B2 | 8/2011 | Saito et al. |
| 2005/0030161 A1* | 2/2005 | Dittrich ............... G05B 19/4184 340/10.6 |

(Continued)

OTHER PUBLICATIONS

Notification of Transmittal of the International Search Report and the Written Opinion of the International Searching Authority from PCT/RU2020/000160, dated Dec. 16, 2020.
(Continued)

*Primary Examiner* — Nguyen Tran
(74) *Attorney, Agent, or Firm* — Westman, Champlin & Koehler, P.A.

(57) ABSTRACT

An industrial process field device includes first and second loop terminals configured to couple to a two-wire process control loop. Device circuitry is powered from the process control loop and monitors a process variable or controls a control device. A current regulator is in series with the loop terminals, and regulates a loop current. A first shunt voltage regulator regulates a voltage across the device circuitry. Supplemental circuitry is connected in series with the first shunt voltage regulator and the second loop terminal, and is powered by power from the two-wire process control loop shunted through the first shunt voltage regulator. A second shunt voltage regulator is connected in series with the first shunt voltage regulator and the second loop terminal, and in parallel with the supplemental circuitry, and regulates a voltage across the supplemental circuitry.

20 Claims, 6 Drawing Sheets

(58) Field of Classification Search
CPC .. H02J 1/06; H02J 13/00001; H02J 13/00002; G05F 1/46
See application file for complete search history.

(56) References Cited

U.S. PATENT DOCUMENTS

| | | | |
|---|---|---|---|
| 2005/0030185 A1* | 2/2005 | Huisenga | G08C 19/02 340/635 |
| 2005/0289276 A1* | 12/2005 | Karschnia | G05B 19/4185 710/305 |
| 2006/0092039 A1 | 5/2006 | Saito et al. | |
| 2006/0290328 A1 | 12/2006 | Orth | |

OTHER PUBLICATIONS

Communication pursuant to Rules 161(1) and 162 EPC, for European Patent Application No. 20793484.5, dated Nov. 3, 2022, 3 pages.

\* cited by examiner

TWO-WIRE INDUSTRIAL PROCESS FIELD DEVICE POWER SUPPLY CIRCUITRY

CROSS-REFERENCE TO RELATED APPLICATION

This Application is a Section 371 National Stage Application of International Application No. PCT/RU2020/000160, filed Mar. 26, 2020, not yet published, the contents of which are hereby incorporated by reference in their entirety.

FIELD

Embodiments of the present disclosure relate to industrial process field devices and, more specifically, to power supply circuitry of such field devices.

BACKGROUND

In industrial settings, control systems are used to monitor and control inventories of industrial and chemical processes, and the like. Typically, the control system performs these functions using field devices distributed at key locations in the industrial process and coupled to control circuitry in a control room by a process control loop.

Typical industrial process field devices include device circuitry that enables the field device to perform conventional field device tasks such as process parameter monitoring and measurements using one or more sensors, and/or process control operations using one or more control elements. Exemplary sensors include pressure sensors, flow sensors, level sensors, temperature sensors, and other sensors used in industrial processes. Exemplary control elements include actuators, solenoids, valves, and other control elements.

The device circuitry of field devices may also include a controller that is used to control the sensors and/or control elements, and communicate with a process control room, or other circuitry, over a process control loop, such as a 4-20 mA process control loop. The process control loop may deliver a current that is regulated by the field device to indicate a sensed parameter value.

Many field devices are configured to be powered from the same two-wire process control loop used to transmit information. The two-wire process control loop may couple to a single field device or to multiple field devices ("multi-drop"). This limits the power that is available to the field device.

Process field devices may be configured to provide supplemental features beyond those typically provided by the device circuitry. Such supplemental features may include, for example, wireless data communications, flash writes, a display, or other supplemental features.

Powering such supplemental features using power provided over the two-wire process control loop requires circuitry that scavenges excess power that is not required to power the device circuitry or provide the desired current over the process control loop.

SUMMARY

Embodiments of the present disclosure are directed to a field device for use in monitoring or controlling an industrial process, and methods of providing power to a field device. One embodiment of the field device includes first and second loop terminals configured to couple to a two-wire process control loop, device circuitry, a current regulator, a first shunt voltage regulator, supplemental circuitry, and a second shunt voltage regulator. The device circuitry is configured to monitor a process variable or control a control device, and is powered by power from the two-wire process control loop. The current regulator is in series with the first and second loop terminals and the device circuitry, and is configured to regulate a loop current flowing through the two-wire process control loop. The first shunt voltage regulator is connected in series with the current regulator and the first and second loop terminals, and in parallel with the device circuitry. The first shunt voltage regulator is configured to regulate a voltage across the device circuitry. The supplemental circuitry is connected in series with the first shunt voltage regulator and the second loop terminal, and is powered by power from the two-wire process control loop shunted through the first shunt voltage regulator. The second shunt voltage regulator is connected in series with the first shunt voltage regulator and the second loop terminal, and in parallel with the supplemental circuitry. The second shunt voltage regulator is configured to control a voltage across the supplemental circuitry.

In one embodiment of the method of providing power to a field device for use in monitoring or controlling an industrial process, first and second loop terminals of the field device are coupled to a two-wire process control loop. Device circuitry of the field device is powered with power received from the two-wire process control loop. The device circuitry being configured to monitor a process variable sensor or control a control device. A loop current through the two-wire process control loop is regulated using a current regulator of the field device connected in series with the two-wire process control loop, the first and second loop terminals, and the device circuitry. A voltage across the device circuitry is regulated using a first shunt voltage regulator of the field device connected in series with the two-wire process control loop and the current regulator, and in parallel with the device circuitry. Supplemental circuitry connected in series with the first shunt voltage regulator and the second loop terminal is powered with power received from the two-wire process control loop shunted through the first shunt voltage regulator. A voltage across the supplemental circuitry is regulated using a second shunt voltage regulator of the field device connected in series with the first shunt voltage regulator and the second loop terminal, and in parallel with the supplemental circuitry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
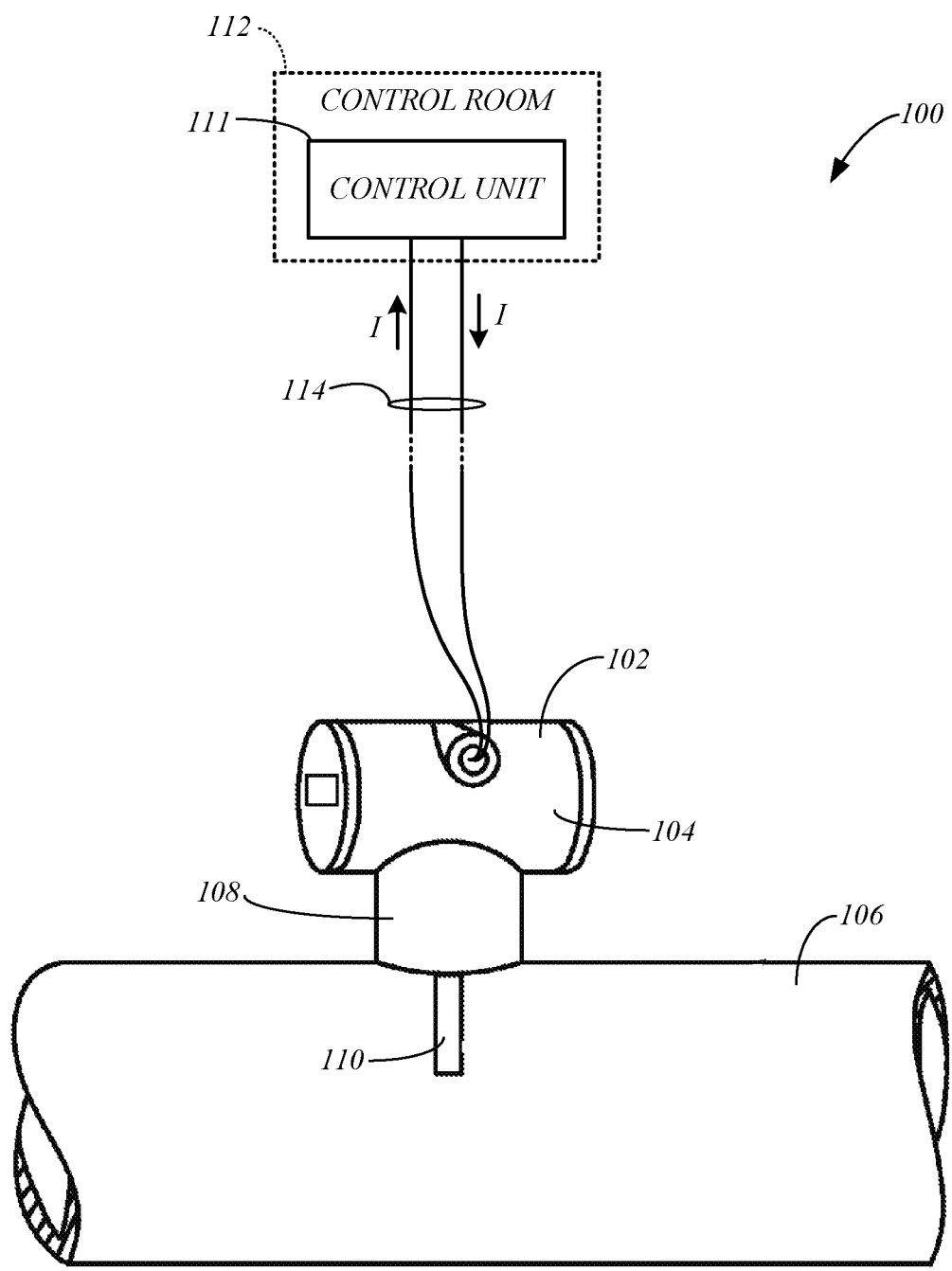
FIG. 1 is a simplified diagram of an example of an industrial process control or measurement system in accordance with embodiments of the present disclosure.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

FIG. 1 is a simplified diagram of an example of an industrial process control or measurement system 100, in accordance with embodiments of the present disclosure. The system 100 may be used in the processing of a material (e.g., process medium) to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a field device 102 having a housing 104 that may be coupled to an industrial process, which may be contained in a pipe 106, through a process coupling 108. The device 102 is illustrated as including one or more process interface elements 110. If the field device 102 is configured as a process variable transmitter, the process interface element 110 may comprise a process variable sensor for measuring a parameter of the process. Examples of the process variable sensor include a pressure sensor for measuring a pressure of the process, a flow sensor for measuring a flow rate of the process, a temperature sensor for measuring a temperature of the process, a level sensor for measuring a level of the process, or another process variable sensor. If the field device 102 is configured as a process variable controller, the process interface element 110 can be configured as a control element for controlling an aspect of the process, such as a valve, an actuator to control a position of a valve, a solenoid, a heating element, or another control element.

Communications between a control unit 111, which may be remotely located from the field device in a control room 112, and the field device 100 may be performed over a process control loop 114, in accordance with conventional analog and/or digital communication protocols. In some embodiments, the process control loop 114 includes a two-wire process control loop, such as a 4-20 milliamp process control loop, in which a process variable or a control signal may be represented by a level of a loop current I flowing through the process control loop 114. Exemplary digital communication protocols include the modulation of digital signals onto the analog current level of the two-wire control loop 114, such as in accordance with the HART® communication standard. Other purely digital techniques may also be employed including FieldBus and Profibus communication protocols.

Figure 2:
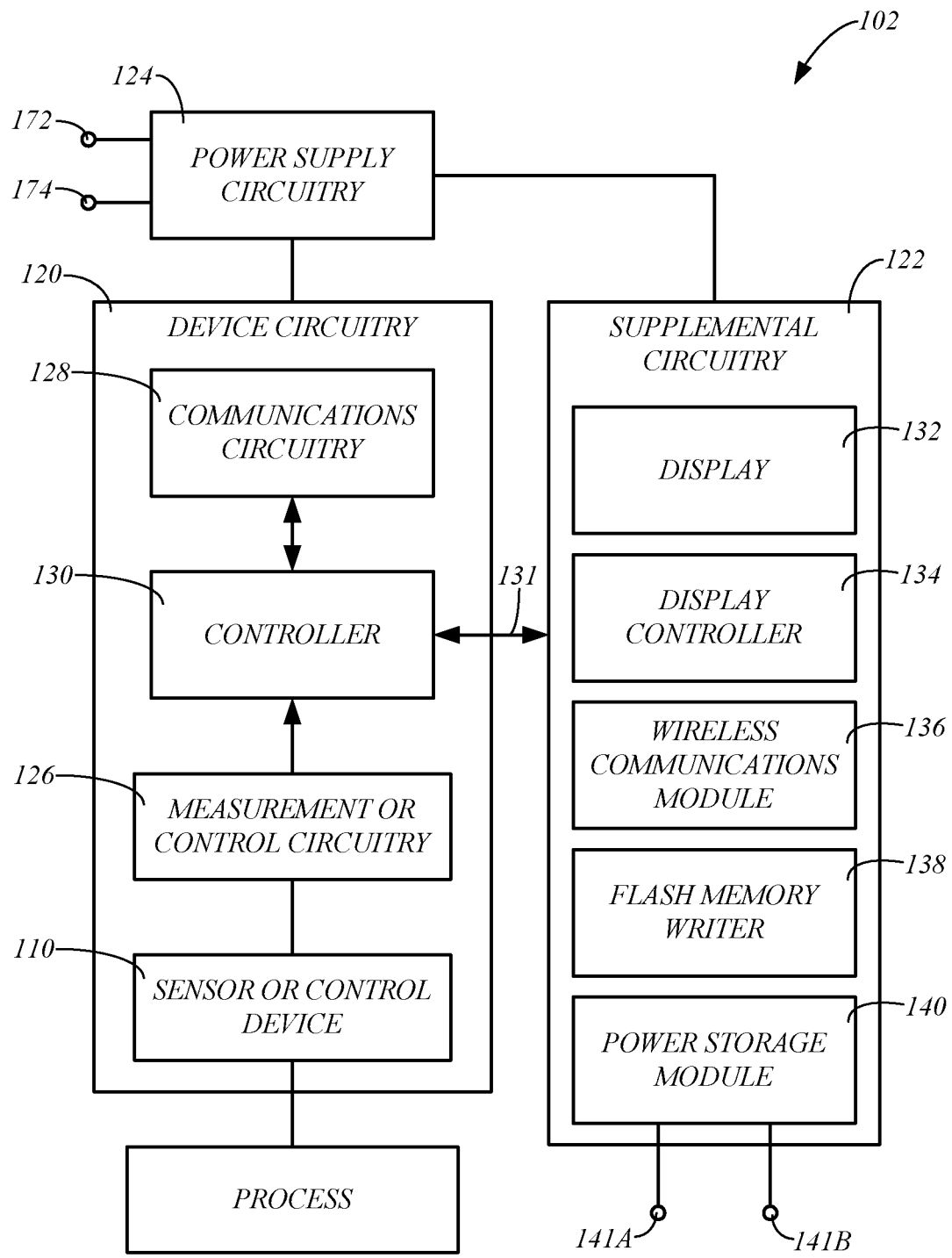
FIG. 2 is a simplified block diagram showing circuitry of a field device in accordance with embodiments of the present disclosure.

FIG. 2 is a simplified block diagram showing circuitry of a field device 102, in accordance with embodiments of the present disclosure. Field device 102 includes device circuitry 120, supplemental circuitry 122 and power supply circuitry 124. The power supply circuitry 124 controls electrical power to the device circuitry 120 and the supplemental circuitry 122, that is received over the two-wire process control loop 114. The power delivered over the two-wire process control loop 114 may be generated by a power source located in the control room 112 (FIG. 1), for example.

The device circuitry 120 generally includes conventional circuitry for performing primary operations of the field device 102, such as sensing or measuring a process variable and/or controlling a process using the one or more process interface elements 110. Thus, the device circuitry 120 may include process interface elements 110 in the form of one or more process variable sensors for sensing the process variable of an industrial process when the field device 102 is configured as a process variable transmitter. Alternatively, the device circuitry 120 may include process interface elements 110 in the form of one or more control elements for controlling an industrial process when the field device 102 is configured as a process controller. The device circuitry 120 may also include measurement circuitry 126 for processing signals from the one or more process variable sensors, and/or control circuitry for controlling the one or more control elements.

The device circuitry 120 may also include communications circuitry 128 for controlling communications over the two-wire process control loop 114. Thus, the communications circuitry 128 may be used to represent a process variable value using the level of the loop current I, and/or communicate data using a modulated signal on the loop current I, for example.

The device circuitry 120 also includes a controller 130, which represents one or more processors that control components of the field device 102 to perform one or more functions described herein in response to the execution of instructions, which may be stored locally in memory of the field device 102 or in memory that is remote from the field device, such as in the control unit 111. Examples of these functions include performing a process variable measurement using the one or more process interface elements 110, performing a process control function using the one or more process interface elements 110, communicating with the control unit 111 over the two-wire process control loop 114 using the communications circuitry 128, and/or other conventional field device functions. Additionally, the controller 130 may communicate with the supplemental circuitry as indicated by arrow 131. The communications 131 may include control signals from the controller 130 to the supplemental circuitry 122, data communication between the controller 130 and the supplemental circuitry 122, and/or other communications.

The supplemental circuitry 122 generally includes circuitry for one or more devices that are used to perform secondary functions that are generally not essential to the process variable measurement or process control functions performed by the device circuitry 120. Examples of the supplemental circuitry include a display 132, a display controller 134 for displaying information on a display, a wireless communications module 136 for providing wireless communications, a flash memory writer 138 for writing data to flash memory, a power storage module 140, and/or other circuitry that may supplement the conventional field device operations performed by the device circuitry 120.

The display 132 may be integrated or connected to the field device 102, and may be an LCD display or another suitable display. The display controller 134 may be used to drive the display of information on the display 132 or another display that is connected to the field device 102. The wireless communications module 136 may be used to provide wireless communication capability to the field device 102, or to expand the wireless communication capability of the field device 102. For example, the wireless communications module 136 may facilitate wireless communications in accordance with a wireless communication protocol, such as WirelessHART® (IEC 62591) or ISA 100.11a (IEC 62734), Bluetooth, WiFi, LoRa, Sigfox, BLE, or another wireless protocol that is not provided by the device circuitry 120, such as by the communications circuitry 128. The flash memory writer 138 may be used to write data to flash memory that is connected to the field device 102.

Due to the important functions provided by the device circuitry 120, it is critical for the power supply circuitry 124 to first serve the power needs of the device circuitry 120. Power for the supplemental circuitry 122 may be scavenged from the excess power that remains after providing the required power (e.g., an operating voltage) to the device circuitry 120 and the power required to generate the desired loop current I over the two-wire process control loop 114.

The power storage module 140 may be used to store the excess power that is not used by the device circuitry 120. The power stored by the power storage module 140 may be used by components of the field device 102, such as components of the supplemental circuitry 122. Examples of the power storage module 140 include a bulk capacitor, a battery, or another suitable power storage component.

The supplemental circuitry 122 may also include user-accessible terminals 141A and 141B for accessing power for powering an external device, as shown in FIG. 2. The terminals 141A and 141B may receive power from the power storage module 140, or another suitable component of the supplemental circuitry 122.

Figure 3:
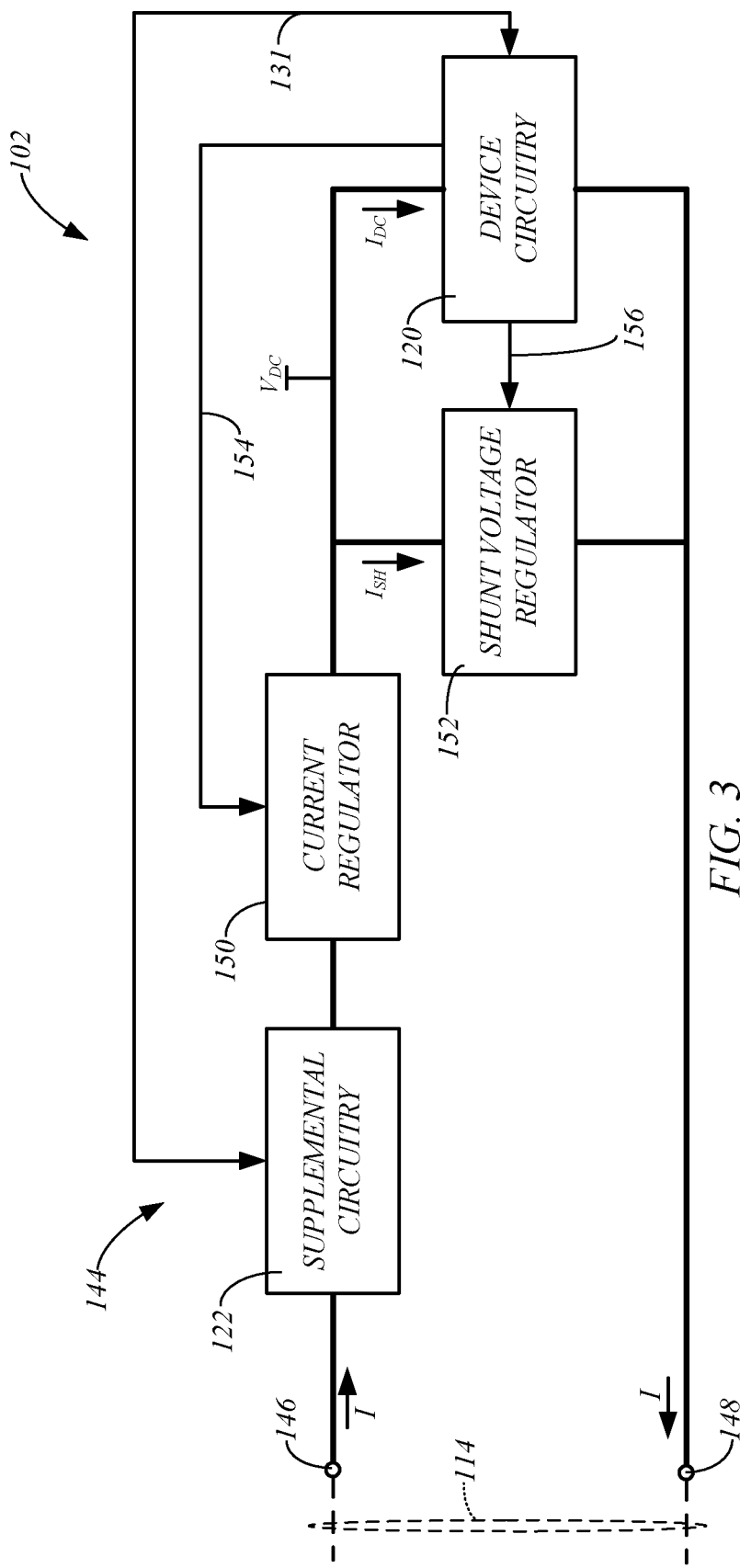
FIGS. 3 and 4 are schematic diagrams of a field device that includes power supply circuitry in accordance with the prior art.
Figure 4:
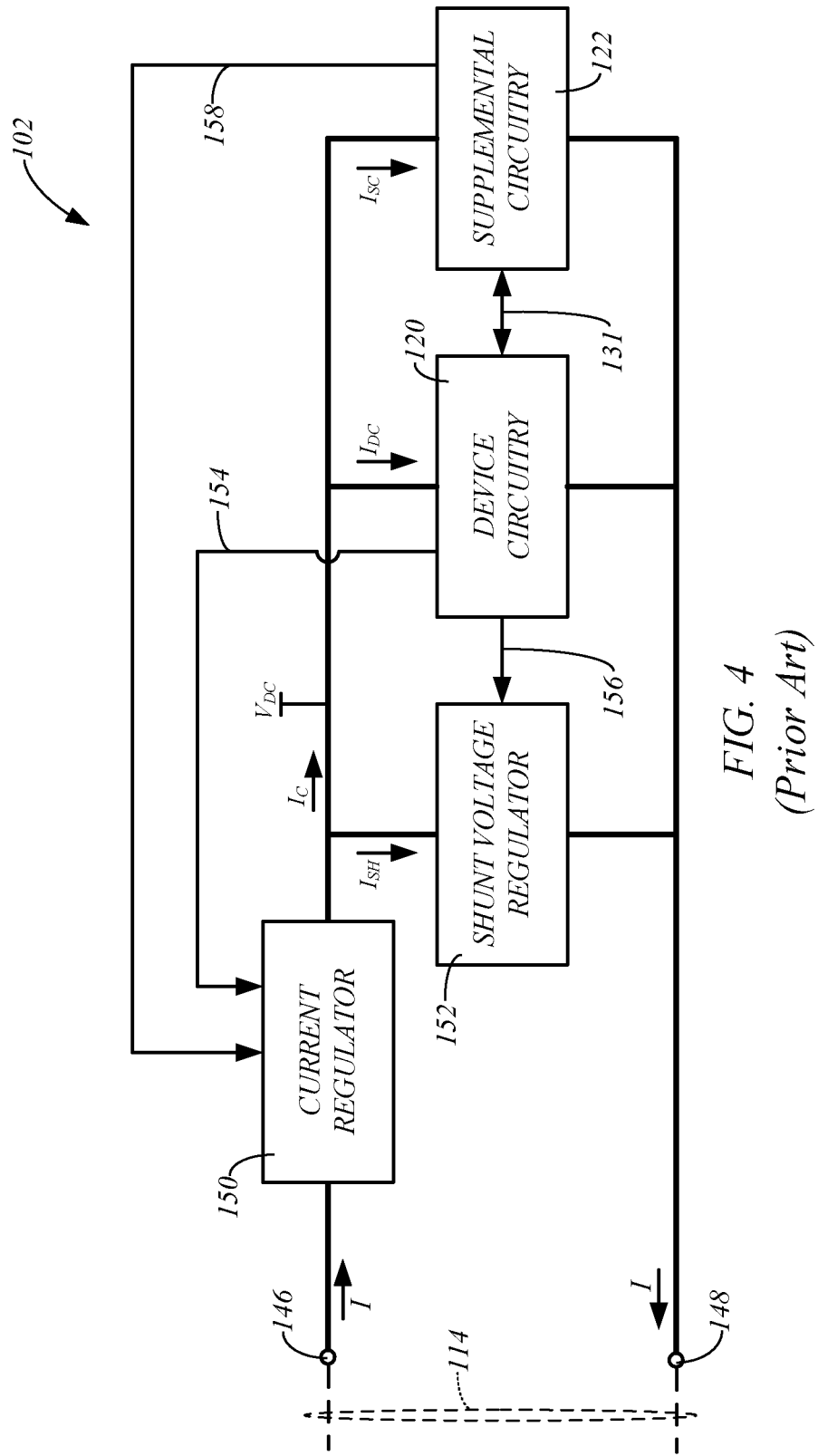

FIGS. 3 and 4 are schematic diagrams of a field device 102 that includes power supply circuitry 144 in accordance with the prior art. The power supply circuitry 144 includes loop terminals 146 and 148 that are used to couple to the two-wire process control loop 114, a current regulator 150, and a shunt voltage regulator 152. The current regulator 150 is in series with the process control loop 114 and the loop terminals 146 and 148, and controls the loop current I in response to a current control signal 154 from the device circuitry 120 (e.g., the communications circuitry) using conventional techniques, such as using feedback from a sense resistor that is in series with the loop current I, for example. The current control signal 154 may direct the current regulator 150 to set the loop current I to a value that represents a process variable sensed by a process variable sensor 110 (FIG. 2).

The shunt voltage regulator 152 receives a current $I_{SH}$ and controls a voltage $V_{DC}$ that powers the device circuitry 120. The voltage $V_{DC}$ may be set by the shunt voltage regulator 152 in response to a voltage control signal 156 from the device circuitry 120, such as from the controller 130 (FIG. 1).

In FIG. 3, the supplemental circuitry 122 is connected in series with the process control loop 114, the loop terminals 146 and 148, and in stack with the device circuitry 120. This configuration of the power supply circuit 144 allows the supplemental circuit 122 to be powered by the loop current I. A current $I_{DC}$ is supplied to the device circuitry, where $I_{DC}=I-I_{SH}$. This configuration forces the device circuitry 120 to work on different voltage levels, complicates the control circuit, and increases the minimum requirements for the lift-off voltage of the field device 102.

In FIG. 4, the supplemental circuitry 122 is in parallel with the device circuitry 120 and the shunt voltage regulator 152. Here, the current $I_C$ ($I_C=I-I_{SH}$) is shared by the device circuitry 120, which receives the current $I_{DC}$, and the supplemental circuitry 122, which receives the current $I_{SC}$. This configuration requires monitoring of the power consumption of the supplemental circuit 122 to prevent under-powering the operation of the device circuitry 120 and disrupting its critical performance of the primary objectives of the field device 102. This monitoring of the power consumption may be provided using control signals 154 and 156 from the device circuitry 120 to the current regulator 150 and the shunt voltage regulator 152, and a control or feedback signal 158 from the supplemental circuitry 122 to the current regulator, for example. Additionally, this configuration of the power supply circuitry 144 may result in greater power loss than the configuration of FIG. 3.

Figure 5:
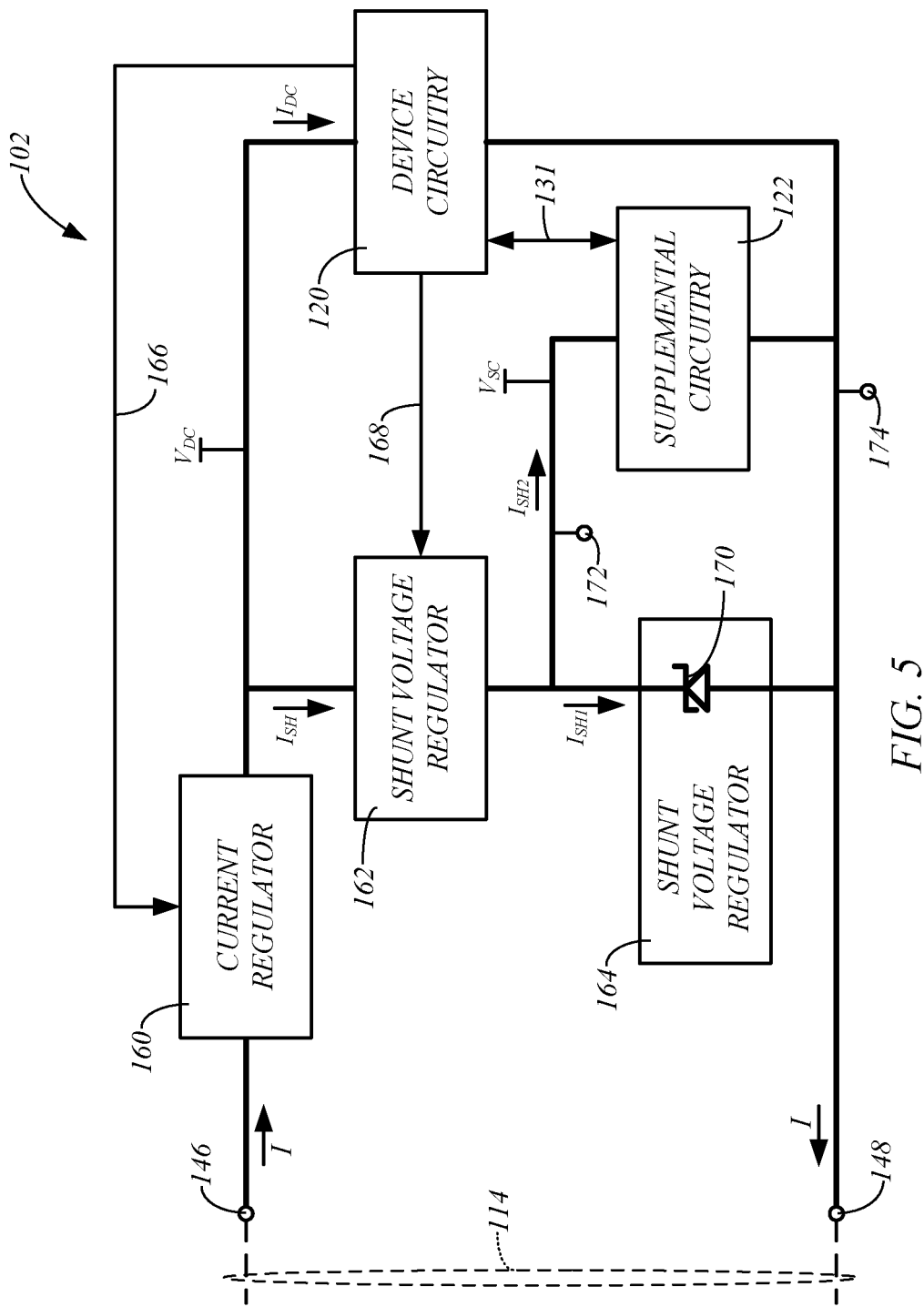
FIG. 5 is a schematic diagram of a field device that includes power supply circuitry in accordance with embodiments of the present disclosure.

FIG. 5 is a schematic diagram of a field device 102 that includes power supply circuitry 124 in accordance with embodiments of the present disclosure. The power supply circuitry 124 includes loop terminals 146 and 148, a current regulator 160, a shunt voltage regulator 162, and a shunt voltage regulator 164. The current regulator 160 is positioned in series with the process control loop 114, the loop terminals 146 and 148 and the device circuitry 120. The current regulator 160 may operate in accordance with conventional current regulators, such as the current regulator 150 of FIG. 3 or 4, and may control the loop current I in response to a current control signal 166 from the device circuitry (e.g., the communications circuitry 128 or the controller 130) using conventional techniques, such as using feedback from a sense resistor that is in series with the loop current I, for example. The current control signal 166 may direct the current regulator 160 to set the loop current I to a value that represents a process variable sensed by a sensor 110 (FIG. 2).

The shunt voltage regulator 162 is connected in series with the current regulator 160 and the two-wire process control loop, and in parallel with the device circuitry 120. The voltage regulator 160 receives a current $I_{SH}$ and controls a voltage $V_{DC}$ that drives the current $I_{DC}$ ($I=I_{DC}-I_{SH}$) and powers the device circuitry 120. The voltage $V_{DC}$ may be set by the shunt voltage regulator 162 in response to a voltage control signal 168 from the device circuitry 120, such as from the controller 130 (FIG. 2), in accordance with conventional techniques.

The shunt voltage regulator 164 and the supplemental circuitry 122 are connected in series to the shunt voltage regulator 162, arranged in parallel between the shunt voltage regulator 162 and ground or common corresponding to the loop terminal 148. The shunt voltage regulator 164 and the supplemental circuitry 122 are powered by power from the two-wire process control loop 114 that is shunted through the shunt voltage regulator 162. The shunt voltage regulator 164 receives a current $I_{SH1}$ and controls a voltage $V_{SC}$ that drives a current $I_{SH2}$ ($I_{SH2}=I_{SH}-I_{SH1}$) and powers the supplemental circuitry 122. For the field device 102 to operate in a stable manner, the voltage $V_{SC}$ across the device circuitry 120 must generally be less than the voltage $V_{DC}$ across the supplemental circuitry 122.

As indicated in FIG. 5, the shunt voltage regulator 164 may comprise a Zener diode 170 or other suitable circuitry. The voltage $V_{SC}$ may correspond to the reverse breakdown voltage of the diode 170.

In some embodiments, the power supply circuitry 124 does not require additional diagnostics of power consumption or connection to the device circuitry 120 over the conventional power supply circuitry 144 (FIG. 4). Rather, the supplemental circuitry 122 simply consumes all the needed power from the power shunted through the shunt voltage regulator 162, and the excess power is fed to the process control loop 114. Power may be consumed by the supplemental circuitry 122 without disruption to the loop current I or the operation of the device circuitry 120, even in the case of a short circuit through the supplemental circuitry 122.

In some embodiments, the field device 102 include output terminals 172 and 174 that are coupled to the power supply circuitry 124, as shown in FIG. 2. In one embodiment, the output terminals 172 and 174 are user accessible terminals that may be accessed through the housing 104 and connected to an external device (e.g., computing device). The output terminal 172 may be coupled to the voltage $V_{SC}$ and the output terminal 174 may be coupled to electrical common or ground corresponding to the loop terminal 148, as shown in FIG. 5. In some embodiments, the voltage difference between the output terminals 172 and 174 may represent a process variable measurement sensed by a process variable sensor 110.

Figure 6:
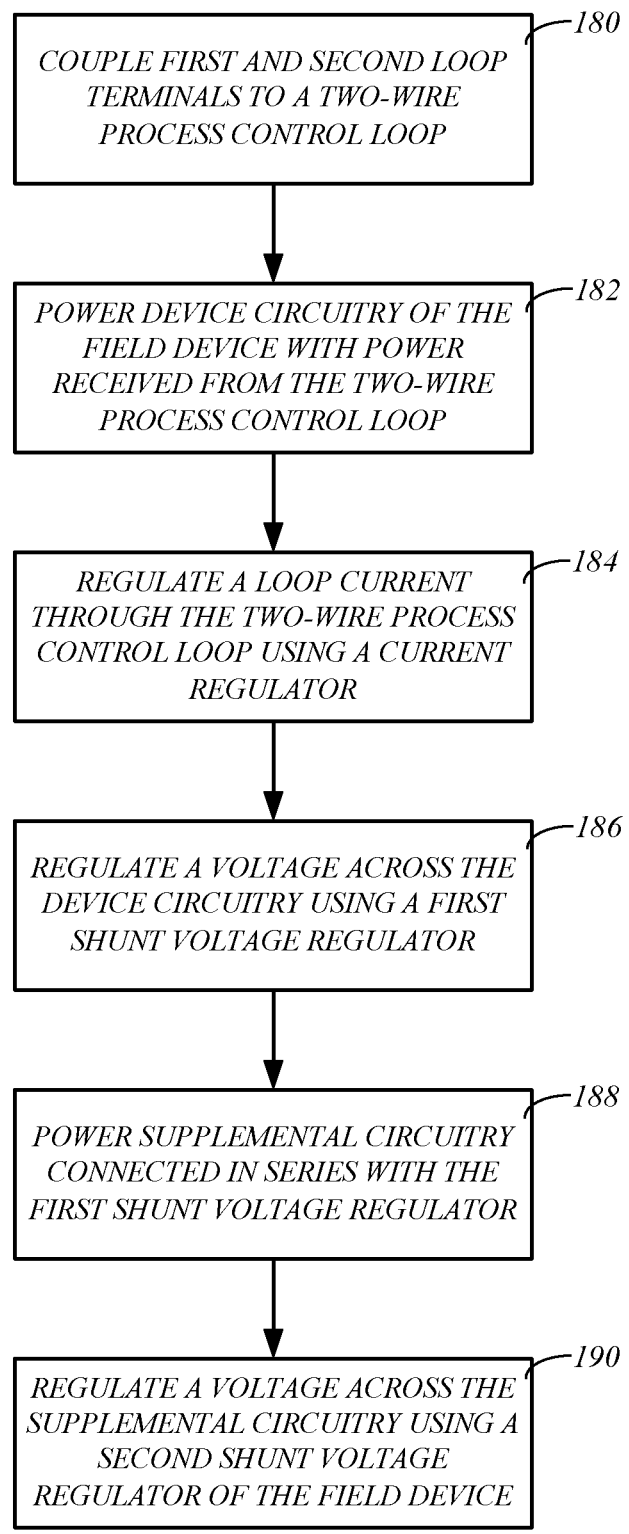
FIG. 6 is a flow chart illustrating an example of a method of providing power to a field device in accordance with embodiments of the present disclosure.

Some embodiments of the present disclosure are directed to a method of providing power to a field device 102. FIG. 6 is a flowchart illustrating embodiments of one example of the method with reference to the power supply circuitry shown in FIG. 5.

At 180, the first and second loop terminals 146 and 148 of the power supply circuitry 124 are coupled to the two-wire process control loop 114. At 182, device circuitry 120 of the field device 102 is powered with power received from the two-wire process control loop 114.

At 184 of the method, a loop current I flowing through the two-wire process control loop is regulated using a current regulator 160 of the field device 102 that is connected in series with the two-wire process control loop 114, the first and second loop terminals 146 and 148, and the device circuitry 120. This regulation of the loop current I may be in response to a control signal 166 from the device circuitry 120, such as the communications circuit 128 or the controller 130 (FIG. 2) of the device circuitry 120. Additionally, the loop current I may be set to a level (e.g., 4-20 mA) in response to the control signal 166 that represents a process variable of an industrial process measured using a process variable sensor 110 (FIG. 2), such as a pressure sensor, a temperature sensor, a flow sensor, and a level sensor.

A voltage $V_{DC}$ across the device circuitry 120 is regulated at 186 using the shunt voltage regulator 162 (first shunt voltage regulator) of the field device 102 that is connected in series with the two-wire process control loop 114 and the current regulator 160, and in parallel with the device circuitry 120, as shown in FIG. 5. The voltage $V_{DC}$ may be controlled in response to a control signal 168 from the device circuitry 120, such as the controller 130.

At 188 of the method, the supplemental circuitry 122, which is connected in series with the shunt voltage regulator 162 and the second loop terminal 148, is powered with power received from the two-wire process control loop 114 that is shunted through the shunt voltage regulator 162.

At 190, a voltage $V_{SC}$ across the supplemental circuitry 122 is regulated using the shunt voltage regulator 164 (second shunt voltage regulator) of the field device 102 that is connected in series with the shunt voltage regulator 162 and the second loop terminal 148, and in parallel with the supplemental circuitry 122. The voltage $V_{SC}$ is used to power the supplemental circuitry 122.

In some embodiments, the voltage $V_{SC}$ and the current $I_{SH2}$ are used to power components of the supplemental circuitry, such as a display 132, a display controller 134 for displaying information on a display, a wireless communications module 136 for providing wireless communications, a flash memory writer 138 for writing data to flash memory, and/or a power storage module 140 for storing electrical energy, which are shown in FIG. 2.

Although the embodiments of the present disclosure have been described with reference to preferred embodiments, workers skilled in the art will recognize that changes may be made in form and detail without departing from the spirit and scope of the present disclosure.

What is claimed is:

1. A field device for use in monitoring or controlling an industrial process comprising:
   first and second loop terminals configured to couple to a two-wire process control loop;
   device circuitry configured to monitor a process variable or control a control device, the device circuitry powered by power from the two-wire process control loop;
   a current regulator in series with the first and second loop terminals and the device circuitry, the current regulator configured to regulate a loop current flowing through the two-wire process control loop and the first and second loop terminals;
   a first shunt voltage regulator connected in series with the current regulator and the first and second loop terminals, and in parallel with the device circuitry, the first shunt voltage regulator configured to regulate a first voltage across the device circuitry and wholly power the device circuitry, wherein the first shunt regulator has a voltage control input coupled to the device circuitry which controls the first voltage;
   supplemental circuitry connected in series with the first shunt voltage regulator and the second loop terminal, and powered by power from the two-wire process control loop shunted through the first shunt voltage regulator; and
   a second shunt voltage regulator connected in series with the first shunt voltage regulator and the second loop terminal, and in parallel with the supplemental circuitry, the second shunt voltage regulator configured to control a second voltage across the supplemental circuitry and thereby power the supplemental circuitry separately from the power provided to the device circuitry by the first shunt regulator.

2. The field device of claim 1, wherein:
   a current $I_{DC}$ travels through the device circuitry;
   a current $I_{SH}$ travels through the first shunt voltage regulator; and
   the loop current is equal to the sum of the current $I_{DC}$ and the current $I_{SH}$.

3. The field device of claim 2, wherein:
   a current $I_{SH1}$ travels through the second shunt voltage regulator;
   a current $I_{SH2}$ travels through the supplemental circuitry; and
   the current $I_{SH}$ is equal to the sum of the current $I_{SH1}$ and the current $I_{SH2}$.

4. The field device of claim 3, wherein the loop current varies between 4 mA and 20 mA.

5. The field device of claim 1, wherein the current regulator is configured to control the loop current in response to control signal from the device circuitry indicating a measured process variable.

6. The field device of claim 5, wherein the device circuitry includes a process variable sensor selected from the group consisting of a pressure sensor, a temperature sensor, a flow sensor, and a level sensor.

7. The field device of claim 1, wherein the device circuitry includes a control element selected from the group consisting of an actuator, a solenoid, a valve, and a heating element.

8. The field device of claim 1, wherein the supplemental circuitry includes a device selected from the group consisting of a display, a display controller for displaying information on a display, a wireless communications module for providing wireless communications, a flash memory writer for writing data to flash memory, and a power storage module for storing electrical energy.

9. The field device of claim 1, wherein the supplemental circuitry includes user accessible terminals for powering an external device.

10. The field device of claim 1, wherein the second shunt voltage regulator comprises a Zener diode.

11. The field device of claim 1, further comprising a first output terminal coupled to the second voltage, and a second output terminal coupled to the second loop terminal.

12. A method of providing power to a field device for use in monitoring or controlling an industrial process, the method comprising:
coupling first and second loop terminals of the field device to a two-wire process control loop;
powering device circuitry of the field device with power received from the two-wire process control loop, the device circuitry configured to monitor a process variable sensor or control a control device;
regulating a loop current through the two-wire process control loop using a current regulator of the field device connected in series with the two-wire process control loop, the first and second loop terminals, and the device circuitry;
regulating a first voltage across the device circuitry using a first shunt voltage regulator of the field device connected in series with the two-wire process control loop and the current regulator, and in parallel with the device circuitry to wholly power the device circuitry, the first shunt voltage regulator receiving a voltage control input from the device circuitry which controls the first voltage;
powering supplemental circuitry connected in series with the first shunt voltage regulator and the second loop terminal with power received from the two-wire process control loop shunted through the first shunt voltage regulator; and
regulating a second voltage across the supplemental circuitry using a second shunt voltage regulator of the field device connected in series with the first shunt voltage regulator and the second loop terminal, and in parallel with the supplemental circuitry thereby powering the supplemental circuitry separately from the power provided to the device circuitry by the first shunt regulator.

13. The method of claim 12, wherein:
powering the device circuitry comprises delivering a current $I_{DC}$ through the device circuitry;
a current $I_{SH}$ travels through the first shunt voltage regulator during regulating the first voltage; and
the loop current is equal to the sum of the current $I_{DC}$ and the current $I_{SH}$.

14. The method of claim 13, wherein:
powering the supplemental circuitry comprises delivering a current $I_{SH2}$ through the supplemental circuitry;
a current $I_{SH1}$ travels through the second shunt voltage regulator during regulating the second voltage; and
the current $I_{SH}$ is equal to the sum of the current $I_{SH1}$ and the current $I_{SH1}$.

15. The method of claim 14, wherein regulating the loop current comprises regulating the loop current to vary between 4 mA and 20 mA.

16. The method of claim 12, wherein regulating the loop current comprises regulating the loop current to a level that is representative of a process variable measured using a process variable sensor of the device circuitry selected from the group consisting of a pressure sensor, a temperature sensor, a flow sensor, and a level sensor.

17. The method of claim 12, wherein the device circuitry includes a control element selected from the group consisting of an actuator, a solenoid, a valve, and a heating element.

18. The method of claim 12, wherein the supplemental circuitry includes a device selected from the group consisting of a display, a display controller for displaying information on a display, a wireless communications module for providing wireless communications, a flash memory writer for writing data to flash memory, and a power storage module for storing electrical energy.

19. The method of claim 12, wherein the supplemental circuitry includes user accessible terminals for powering an external device.

20. The method of claim 12, further comprising providing a first output terminal coupled to the second voltage and a second output terminal coupled to the second loop terminal.

* * * * *